3,004,893
ENTERIC COATED TRYPSIN AND CHYMOTRYPSIN ANTI-INFLAMMATORY COMPOSITIONS

Gustav Julius Martin, Philadelphia, Pa., assignor to Richardson-Merrell Inc., a corporation of Delaware
No Drawing. Filed Oct. 21, 1959, Ser. No. 847,701
8 Claims. (Cl. 167—73)

This invention relates to and has for its object the provision of pharmaceutical forms of trypsin and chymotrypsin which may be orally administered to obtain systemic absorption of these proteolytic enzymes from the ileum.

The physiological function of the proteolytic enzymes in digestion of proteins is well known, their action being to split proteins into amino acids and peptides. Hence they have long been administered orally for digestive purposes in cases of pancreatic deficiency, see example "Entozyme," Pacific Drug Review, July 1959, page 66, and Merck Index, 6th edition, Merck & Co., Inc., Rahway, November 1952, page 981.

Proteolytic enzymes have been demonstrated to be effective therapeutics in reducing inflammation and edema when properly administered. It is theorized that trypsin functions as a depolymerase at the site of inflammation to reverse the fibrogen-fibrin reaction responsible for the inflammation. As the porosity of the protein network wall is increased, the intercellular fluid is released, hydrostatic pressures are reduced, capillaries open, and circulation in the local area is restored. Thus the anti-inflammatory action of trypsin is a direct result of its facilitating drainage from the inflamed area by lysis of fibrin plugs in the lymphatics and capillaries about the inflammatory lesion. Trypsin and chymotrypsin, closely related enzymes, are active both by local and parenteral administration.

It is known that trypsin, chymotrypsin and some other proteolytic enzymes can be administered intramuscularly and are effective in reducing inflammation. Thus far, however, marketable products for effective oral administration have not been prepared. The oral administration of such therapeutic enzymes for systemic activity has been assumed impossible because the agents are broken down by the enzymes of the stomach and pancreas. Furthermore, it was believed that even if hydrolysis did not occur, the molecular size of the therapeutic agents (approximately 34,000 in the case of trypsin) was so large as to prevent absorption from the intestinal tract.

This invention is based on the discovery that trypsin and chymotrypsin can be absorbed through the walls of the ileum, more particularly, the lower ⅔ on the small intestine. This discovery is most unexpected because, as stated above, it had been assumed that since these are digestive enzymes they would undergo chemical reaction and decomposition in the intestinal tract, and hence could not be absorbed systemically and in enzymatically effective form into the blood stream from the intestine. This unexpected property of absorption from the ileum into the blood stream without loss of effectiveness in controlling inflammation is taken advantage of in the present invention by providing suitable dosage unit form trypsin or chymotrypsin which pass through the acidic and digestive environment of the stomach and upper region of the gastrointestinal tract before releasing the proteolytic enzyme which they carry. This delayed release action is obtained preferably by enterically coating the dosage unit form.

The effectiveness of orally administered therapeutic agents depends on two factors: first, stability in the gastrointestinal tract; and second, absorption from the tract. Ordinarily these enzymes enter into the digestive action of the small intestine. To simplify the description of the invention, the following discussion will use trypsin as the proteolytic enzyme, it being understood that chymotrypsin and some others may be used.

The invention consists in formulating trypsin or equivalent enzymes in a suitable enteric coated tablet or capsule in which the coating is of such a composition and thickness that it will not break down until the tablet or capsule has reached the ileum or lower part of the small intestine. By this procedure the enzyme is protected so that it gets through the digestive phase in the upper portion of the ileum without entering into digestive action expected of the proteolytic enzymes at this point. Instead, it is not released in the intestine until it is well past the point of the digestive action of the gastric and pancreatic enzymes. The trypsin dose is preferably administered in the form of a unit containing from 10–50 milligrams of trypsin per enteric coated tablet or capsule. The enteric coating can be any standard one, but cellulose acetate phthalate is preferred.

Trypsin and chymotrypsin are unique in that they will increase tissue permeability and thus actually facilitate their own absorption. Thus, if this proteolytic action is protected by the device of formulation in a suitable enteric coated tablet or capsule, this action will ensure passage through the intestinal mucosa and thence into the blood stream where the therapeutic activity will be manifested.

This effect has been demonstrated in vivo by experimental results obtained using rats as the test animals. Inhibition of egg-white edema was measured in accordance with the procedure described in Selye, Endocrinolgy, 21, page 169 (1937), wherein six rats of the Wistar strain were employed, edema being created in one hind paw by the injection of egg-white; the other hind paw was used as a control. Following are the results obtained:

| | Inhibition, percent |
|---|---|
| Trypsin orally, 100 mg./k | 0 |
| Trypsin in ileum, 20 mg./k | 50 |
| Trypsin I.M., 20 mg./k | 50 |

The results show that trypsin, taken orally using non-enteric coated standard dosage forms is ineffective but that trypsin taken in the dosage forms of the invention is just as effective as the intramuscular trypsin which was used heretofore.

Tablets for use in the present invention may be compounded to contain the usual excipients, fillers, dyestuffs, etc. For example, one may use as fillers, starch, powdered cane sugar, lactose, etc.; and as binding agents one may use polyethylene glycol 4000 or 6000, zein, and ethyl cellulose. Other binding agents such as gum acacia, gelatin, corn syrup and the like may also be used, but since these require water and as trypsin is unstable in the presence of water these are not ordinarily used. Lubricants such as calcium or magnesium stearate, mineral oil, Carbowax or hydrogenated vegetable oil may be used; and disintegrating agents such as corn starch or potato starch may also be used. In practice, dry granulations are made containing the active ingredient, filler, binder and (if desired) dyestuffs. This mixture is then compressed (e.g., in the standard single punch or rotary multiple punch machine or hand machines) to obtain the tablets in form for enteric coating.

When gelatin capsules are used, the granulations may be prepared as described above for the preparation of tablets, then filled in accordance with standard procedures. In addition, a liquid fill may be used by mixing the proteolytic enzyme with an oleaginous material, such as sesame oil, corn oil, peanut oil, etc.

Any enteric coating may be employed so long as it will protect the proteolytic enzyme from dissolution as it passes through the stomach and upper intestine and will liberate the enzyme in the ileum for systemic action.

Preferably the enteric coating material is a cellulose lower fatty acid ester phthalate, particularly cellulose acetate phthalate. However, other cellulose derivatives may be used. For example, cellulose ethers or mixed ether-esters may be substituted for the cellulose esters. Thus, among the enteric coating materials which may be used (in addition to cellulose acetate phthalate) are the materials formed by reacting cellulose acetate, cellulose propionate, cellulose acetate-butyrate, ethyl cellulose, butyl cellulose, etc., with phthalic or maleic anhydrides or the like, in the presence of a tertiary organic base (or in the presence of a solvent). The materials used for this purpose are known substances and their preparation is described in United States Patent Nos. 2,093,462, 2,093,464, and 2,126,460.

Of course, the properties of the coating may be varied by controlling the free carboxyl content, coating thickness, etc. For use in the present invention, the coating materials should have a free carboxyl content of about 5–25 percent with a 10–20 percent range preferred. The cellulosic derivatives used for applying the enteric coating may be used in the form of solutions or suspensions. However, in the coating operation, as well as in the tabletting or encapsulation, the presence of water must be avoided. Thus, a suitable coating solution may be made by dissolving about 15 g. of cellulose acetate phthalate (containing about 33 percent acetyl and about 32 percent phthalyl) in a mixture of 45 g. ethylene dichloride and 5 g. methanol. Similarly, a satisfactory solution may be prepared by dissolving about 10 g. cellulose maleate (containing about 62 percent malyl) in 75 g. dioxane.

To effect coating, the tablets or capsules may be dipped, sprayed, etc., with the solution of cellulosic derivative until a coating of the desired thickness is obtained. Of course, the thickness of the coating may obviously also be controlled by control of the concentration or cellulosic derivative in the solution being utilized. Plasticizers such as triacetin and other desirable materials insoluble in acid may also be added, if desired. Enteric coatings of this general type are old.

The only limitation on the enteric coating is that it shall preserve the trypsin or other proteolytic enzyme from dissolution until it reaches the lower portion of the ileum. Hence in addition to the coatings described above, one may use any of the conventional enteric coatings such as shellac and others as described in Remington's "Practice of Pharmacy," 11th ed., Martin & Cook (Mack Pub. Co.), 1956, pp. 407–412.

Each tablet or capsule should contain from about 10 to about 50 mg. trypsin. Preferably, the trypsin content per dosage unit is about 20 mg. The dosage schedule will, of course, be directed by the attending physician, but ordinarily it would be between 75 to 250 mg. of trypsin or chymotrypsin per day for an adult person. Preferably these dosages are at spaced intervals, for instance, every six hours. Accordingly, a typical treatment would comprise the oral administration of two tablets each containing 20 mg. of trypsin four times per day.

Following are specific working examples showing the compositions which are used as well as the method of manufacture. It is, of course, recognized that these examples are merely illustrative and are in no way limitative of the invention. Sieve sizes are the generally recognized U.S. standard sieve sizes, and parts are given by weight unless otherwise indicated. Any of the coating procedures shown in United States Patent No. 2,196,768 may be used in the invention.

Example I

Fifty grams crystalline trypsin are placed in a ball mill with 250 ml. dry sesame oil, and the mixture is milled for five hours. The suspension is then filled into one thousand soft gelatin capsules (about 0.30 ml. per capsule), and these are coated with cellulose acetate phthalate in the usual way by means of a 4:1 dope (solids:solvent by weight) wherein the cellulosic coating material contains 38.7 percent acetyl and 22 percent phthalyl.

Example II

Fifty grams crystalline trypsin are intimately mixed with five grams sucrose, five grams starch and 85 grams lactose. This mixture is granulated with ten percent solution of Carbowax 4000 in alcohol and forced through a #8 mesh screen while wet. The granulation is dried and forced through a #14 mesh screen. Calcium stearate is added as a lubricant and 1000 tablets, each containing 50 mg. trypsin are compressed. These tablets are coated with cellulose acetate phthalate by means of a 3:1 dope (solids:solvent by weight) of cellulose phthalate wherein the cellulosic coating material contains 64 percent phthalyl.

Example III

The procedure of Example I is followed except that fifty grams chymotrypsin is substituted for the trypsin in the reference example.

Example IV

The procedure of Example II is followed except that fifty grams chymotrypsin is substituted for the trypsin in the reference example.

Example V

A commercially available proteolytic enzyme concentrate containing 68% trypsin, 30% chymotrypsin, and 2% ribonuclease is used. Two hundred and six and two-tenths grams (206.2 gm.) of proteolytic enzymes concentrate are mixed intimately with 1400 gm. of lactose. The mixture is granulated with a solution of 333 gm. of polyethylene glycol 4000 in 500 ml. of carbon tetrachloride. The granulation is forced through a 14-mesh stainless steel screen and dried thoroughly at room temperature. It is then passed through a 16-mesh screen. Twenty grams of talc and 10 gm. of magnesium stearate are added to the granulation and mixed by tumbling. The granulation is then compressed into 10,000 tablets. The tablets are then enteric coated by conventional procedures.

This invention may be variously otherwise embodied within the scope of the appended claims. It is to be understood that while the specification and claims are largely limited to trypsin, the latter is simply illustrative of the larger class of proteolytic enzymes referred to earlier in the specification, hence they are to be considered as equivalents of trypsin.

This is a continuation-in-part of my application Serial No. 722,850, filed March 21, 1958, which is in turn a continuation-in-part of my application Serial No. 599,360, filed July 23, 1956, both now abandoned.

I claim:

1. An article of manufacture for the introduction of trypsin into the blood stream for the systemic treatment of inflammation which comprises an orally administratable dosage unit in which the effective therapeutic ingredient consists of 10 to 50 mgs. of trypsin, said dosage unit being enterically coated the enteric coating being of sufficient thickness so as to resist dissolution and disintegration of the dosage unit in passing through the gastrointestinal tract until it reaches the ileum in which it disintegrates permitting liberation of the trypsin and absorption of the trypsin into the blood stream.

2. An article of manufacture for the introduction of chymotrypsin into the blood stream for the systemic treatment of inflammation which comprises an orally administratable dosage unit in which the effective therapeutic ingredient consists of 10 to 50 mgs. of chymotrypsin, said dosage unit being enterically coated the enteric coating being of sufficient thickness so as to resist dissolution and disintegration of the dosage unit in passing through the gastro-intestinal tract until it reaches the ileum in which it disintegrates permitting liberation of the chymotrypsin and absorpion of the chymotrypsin into the blood stream.

3. An article of manufacture for the introduction of proteolytic enzymes into the blood stream for the systemic treatment of inflammation which comprises an orally administratable dosage unit in which the effective therapeutic ingredients consist of 10 to 50 mgs. of proteolytic enzymes of the group consisting of trypsin of proteolytic enzymes of the group consisting of trypsin and chymotrypsin in a pharmaceutically acceptable carrier having an enteric coating of sufficient thickness to resist disintegration of the dosage unit and release of the enzymes in the acidic and enzymatic environment of the stomach but disintegratable in the ileum where the enzymes are released and absorbed into the blood stream.

4. An article of manufacture in accordance with claim 3 in which the enteric coating is cellulose acetate phthalate.

5. A method of treatment of inflammation which comprises orally ingesting an enterically coated dosage unit form of trypsin in a pharmaceutically acceptable carrier, said enteric coating being resistant to the acidic and enzymatic environment of the stomach, but being disintegratable by the digestive juices of the ileum whereby the trypsin is released from the dosage unit and is absorbed by the ileum into the blood stream, the amount of trypsin in said dosage unit being at least 10 mg. and sufficient to establish in the blood stream amounts of trypsin effective to reduce inflammation.

6. A method of introducing trypsin into the blood stream which comprises orally ingesting in enterically coated form from 10 to 50 mg. of trypsin in a pharmaceutically acceptable carrier, said enteric coating being resistant to the acidic and enzymatic environment of the stomach, but being disintegratable by the digestive juices of the ileum whereby the trypsin is released from the dosage unit and is absorbed from the ileum into the blood stream.

7. A method of treating inflammation and edema which comprises orally administering at spaced intervals of time from 75 to 250 mg. per day of trypsin in the form of a dosage unit having an enteric coating, said enteric coating being resistant to the acidic and enzymatic environment of the stomach, but being disintegratable by the digestive juices of the ileum whereby the trypsin is released from the dosage unit and is absorbed from the ileum into the blood stream.

8. A method in accordance with claim 7 in which chymotrypsin is used as the proteolytic enzyme.

References Cited in the file of this patent

UNITED STATES PATENTS 412,837   Carnrick _____ Oct. 15, 1889

OTHER REFERENCES

U.S. Dispensatory 25, pages 965–968, 1955.
Gold et al.: American J. of the Med. Sciences, vol. 228, pages 568–585 (1954).
Pacific Drug Review, Entozyme, page 66, July 1949.